United States Patent [19]

Mevissen

[11] Patent Number: 4,973,292
[45] Date of Patent: Nov. 27, 1990

[54] STEEL RIMMED PLASTIC PULLEY

[75] Inventor: Hubertus G. Mevissen, Nobleton, Canada

[73] Assignee: Litens Automotive Partnership, Woodbridge, Canada

[21] Appl. No.: 470,314

[22] Filed: Jan. 25, 1990

[51] Int. Cl.$^5$ .............................................. F16H 55/36
[52] U.S. Cl. ....................................................... 474/192
[58] Field of Search ......... 474/166, 177, 178, 190–192

[56] References Cited

U.S. PATENT DOCUMENTS

| | | | |
|---|---|---|---|
| 1,434,239 | 10/1922 | Williams | 474/192 X |
| 2,836,982 | 6/1958 | Voss et al. | 474/192 X |
| 4,217,944 | 8/1980 | Pascal | 474/192 X |

Primary Examiner—Thuy M. Bui
Attorney, Agent, or Firm—Cushman, Darby & Cushman

[57] ABSTRACT

A pulley for engaging an endless belt or the like suitable for automotive vehicular use comprising an annular body of plastic material including an annular inner hub portion defining a central axis, an annular outer peripheral portion and an intermediate portion integrally interconnecting the annular outer peripheral portion in concentric relation with the inner hub portion, and a temperature compensating-wear resistant rim structure formed of metal. The rim structure is formed with a series of wear resistant arcuate sections spaed apart with a temperature compensating connecting section extending between adjacent ends of adjacent arcuate sections. The arcuate sections include inwardly facing surfaces and the peripheral portion of the annular plastic body include surfaces secured to the inwardly facing surfaces of the arcuate section and the connecting sections therebetween so that the arcuate sections present outwardly facing arcuately surfaces disposed within a surface of revolution about the axis of the hub portion for engaging the endless belt.

16 Claims, 3 Drawing Sheets

STEEL RIMMED PLASTIC PULLEY

This invention relates to pulleys of the type adapted to engage endless belts or the like and, more particularly, to improvements in the construction of such pulleys which are particularly adapted for use with endless belts of the type used in automotive vehicles, as, for example, serpentine belts and/or timing belts.

Heretofore, the pulleys utilized in the harsh environment present in automotive vehicular use have been constructed of metal. Such pulleys give adequate service under the great variety of temperature conditions to which they are subjected. Metal pulleys have the disadvantage that they are heavy. It is known that pulleys formed primarily of plastic material can be of lighter weight construction, however, such pulleys have not been widely adapted for automotive use due to their lack of good wear characteristics. Moreover, there always exists a need to provide pulleys which are more cost effective.

An object of the present invention is to provide a cost effective pulley which achieves the known advantages of metal pulleys and plastic pulleys while eliminating the known disadvantages thereof. The present invention is based upon the proposition that the advantages of both materials can be utilized if the interface between the two materials is temperature compensating. In accordance with the principles of the present invention, the objectives noted above are achieved by providing a pulley for engaging an endless belt or the like suitable for automotive vehicular use which comprises an annular body of plastic material including an annular inner hub portion defining a central axis, an annular outer peripheral portion and an intermediate portion integrally interconnecting the annular outer peripheral portion in concentric relation with said inner hub portion, and a temperature compensating-wear resistant annular rim structure formed of metal. The rim structure is formed with a series of wear resistant arcuate sections spaced apart with a temperature compensating connecting section extending between adjacent ends of adjacent arcuate sections. The arcuate sections include inwardly facing surfaces and the annular plastic body includes surfaces secured to the inwardly facing surfaces of the arcuate sections and the connecting sections therebetween so that the arcuate sections present outwardly facing arcuate surfaces disposed within a surface of revolution about the axis of the hub portion for engaging the endless belt.

The body of plastic material is molded with the rim structure. Preferably, the rim structure is formed of a strip of sheet steel having opposite ends fixed together with the temperature compensating sections being of a U-shaped configuration in which the bight portion is wider than the free ends of the leg portions.

Another object of the present invention is the provision of a pulley of the type described which is simple in construction, effective in operation and economical to manufacture.

These and other objects of the present invention will become more apparent during the course of the following detailed description and appended claims.

The invention may best be understood with reference to the accompanying drawings wherein an illustrative embodiment is shown.

DESCRIPTION OF THE PREFERRED EMBODIMENTS

Figure 1:
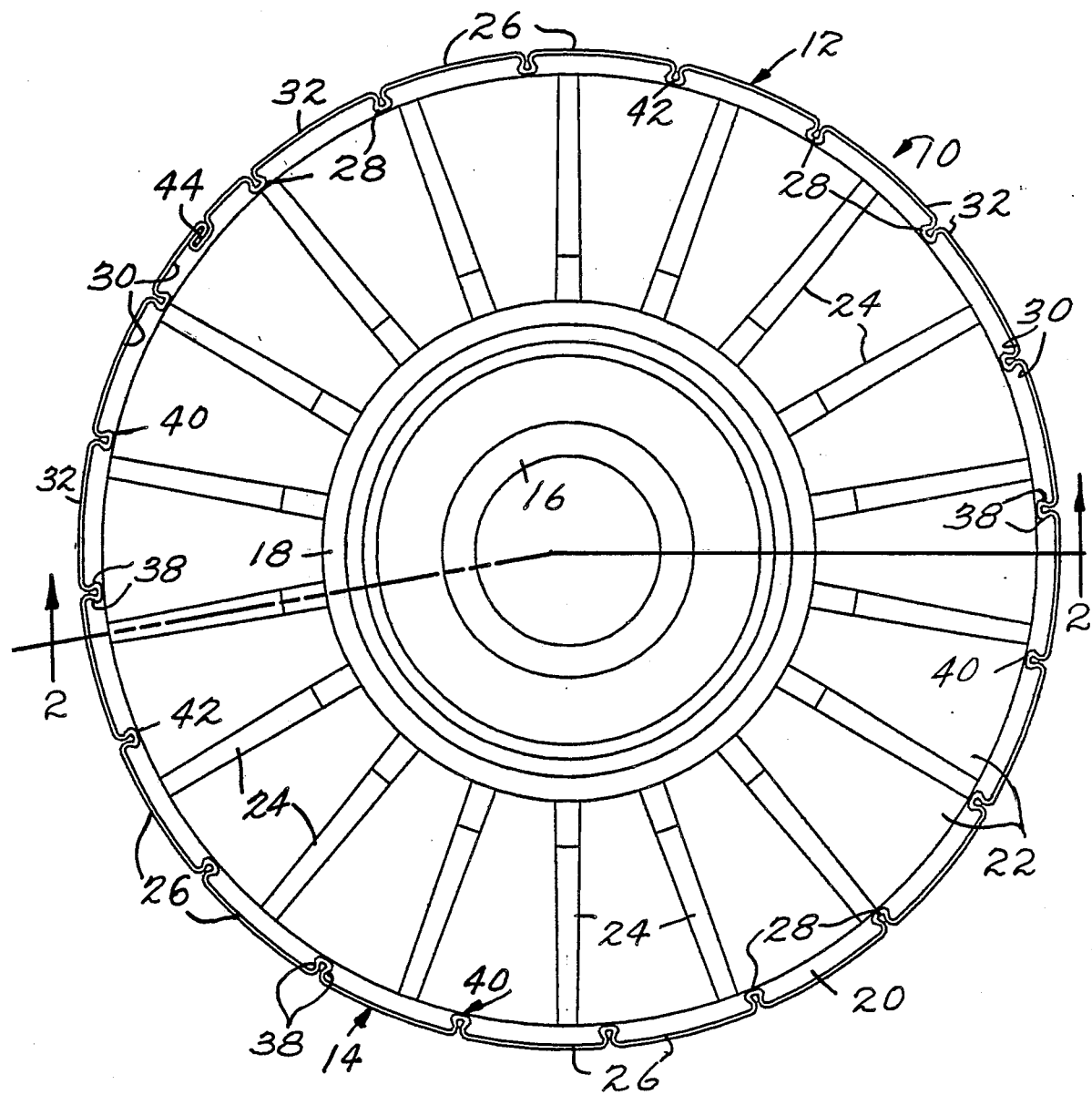
FIG. 1 is a side elevational view of a pulley embodying the principles of the present invention.
Figure 2:
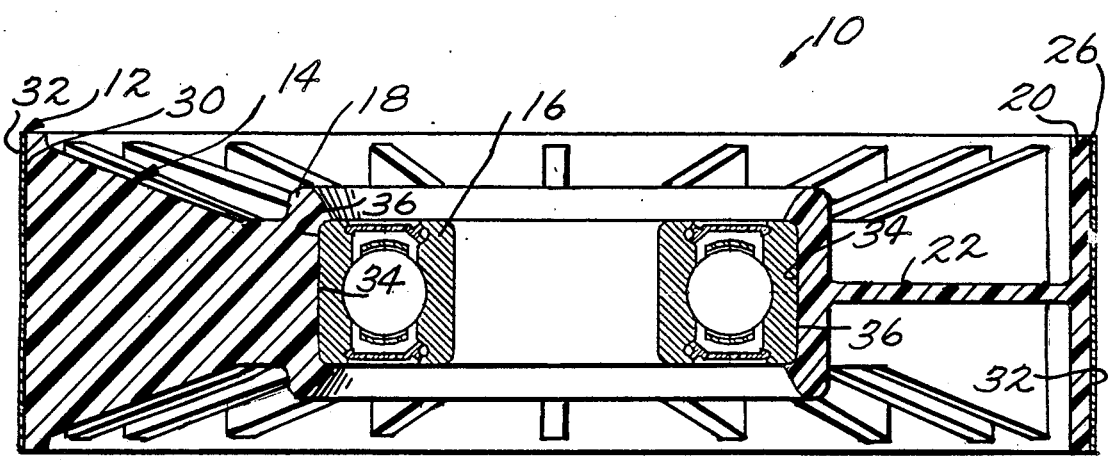
FIG. 2 is a sectional view taken along the line 2—2 of FIG. 1.

Referring now more particularly to the drawings, there is shown in FIGS. 1 and 2 thereof one embodiment of a pulley, generally indicated at 10, embodying the principles of the present invention. As shown, the pulley 10 consists essentially of two components, (1) an annular body of plastic material, generally indicated at 12, and (2) a rim structure formed of metal, generally indicated at 14.

Preferably, the annular body of plastic material is molded with the rim structure and with a ball bearing assembly 16. As shown, the annular body 2 of plastic material includes an inner annular hub portion 18 and an outer annular peripheral portion 20 integrally interconnected by an intermediate portion which includes a central annular wall 22 extending radially between the exterior peripheral surface of the inner hub portion 18 and the interior peripheral surface of the outer peripheral portion 20. The intermediate portion also includes a series of annularly spaced strengthening ribs 24 extending axially from the radial wall 22 in opposite directions between the inner annular hub portion 18 and the outer peripheral portion 20.

Any suitable plastic material providing sufficient strength and lightweight characteristics may be utilized to form the annular body 12. A typical example would be glass-reinforced nylon. The glass-reinforcing is of conventional configuration, as, for example, glass fibers or the like. It will be understood that the glass-reinforcing may be in glass fiber fabric form if desired.

An important characteristic of the rim structure 14 is that it includes a series of spaced wear resistant arcuate sections 26 having adjacent ends of adjacent sections interconnected in spaced relation by temperature compensating connecting sections 28. Preferably, the rim structure is made of a strip of sheet steel so that the connecting sections extend inwardly of inwardly facing surfaces 30 of the arcuate sections 26 and so that the arcuate sections 26 provide exterior arcuate surfaces 32 disposed in a surface of revolution about the axis of the hub portion 18. The hub portion 18 is molded so that it provides an inwardly facing inner peripheral surface 34 which adheres to an exterior peripheral surface 36 of the ball bearing assembly 16.

The outer peripheral portion 20 is retained in concentric relation with the inner hub portion 18 by the intermediate portion which includes the central annular wall 22 and strengthening ribs 24. As shown, the connecting portions 28 of the rim structure 14 are of generally U-shaped configuration in cross-section each including leg portions 38 having a first pair of ends which are integrally connected with the adjacent ends of adjacent arcuate sections 26 and a bight portion 40 extending between the opposite pair of ends of the leg portions. Preferably, each bight portion 40 extends between the adjacent pair of ends of the associated leg portions 38 a distance greater than the spacing between the first pair of ends.

In the embodiment shown in FIG. 1, the space between the leg portions 38 and bight portion 40 of each connecting section 28 is filled with plastic material 42 although it is within the contemplation of the present invention to omit the inclusion of plastic material 42. With the connecting sections 28 configured in the preferred manner specified, the connecting sections 28 are temperature compensated in that they tend to expand with increased temperature and to contract with decreased temperature conditions. It will be understood that other configurations can give similar temperature compensation functions. This insures that the exterior arcuate surfaces 32 of the arcuate sections 26 which are disposed in a surface of revolution about the axis of the hub portion 18 and ball bearing assembly 16 will be maintained in a dimensionally stable condition under a great variety of temperature conditions such as are encountered in the harsh environment of automotive vehicular usage.

In the embodiment shown in FIG. 1 and 2, the rim structure 14 is preferably made from a strip of sheet metal having opposite ends fixedly interconnected in a lap joint as indicated at 44. It will be understood that other fixed connections, such as welding or the like, may be utilized. It is within the contemplation of the present invention in its broadest aspects that the rim structure 14 could be formed without fixedly interconnecting the ends of the strip, such as, for example, eliminating a connecting section 28 or splitting a connecting section 28. The rigid interconnection including the lap joint 44 shown is preferred and any imbalance caused by the lap joint 44 may be compensated for.

Preferably, the pulley 10 is used as the idler pulley in a tensioner assembly for use with a serpentine belt system or as the idler pulley in a timing belt system. In the embodiment shown, the free ends of the U-shaped connecting sections 28 are spaced closely together. It is within the contemplation of the present invention to space these ends further apart so as to receive an interior tooth of a timing belt and to utilize the pulley as an interior timing belt pulley.

Figure 3:
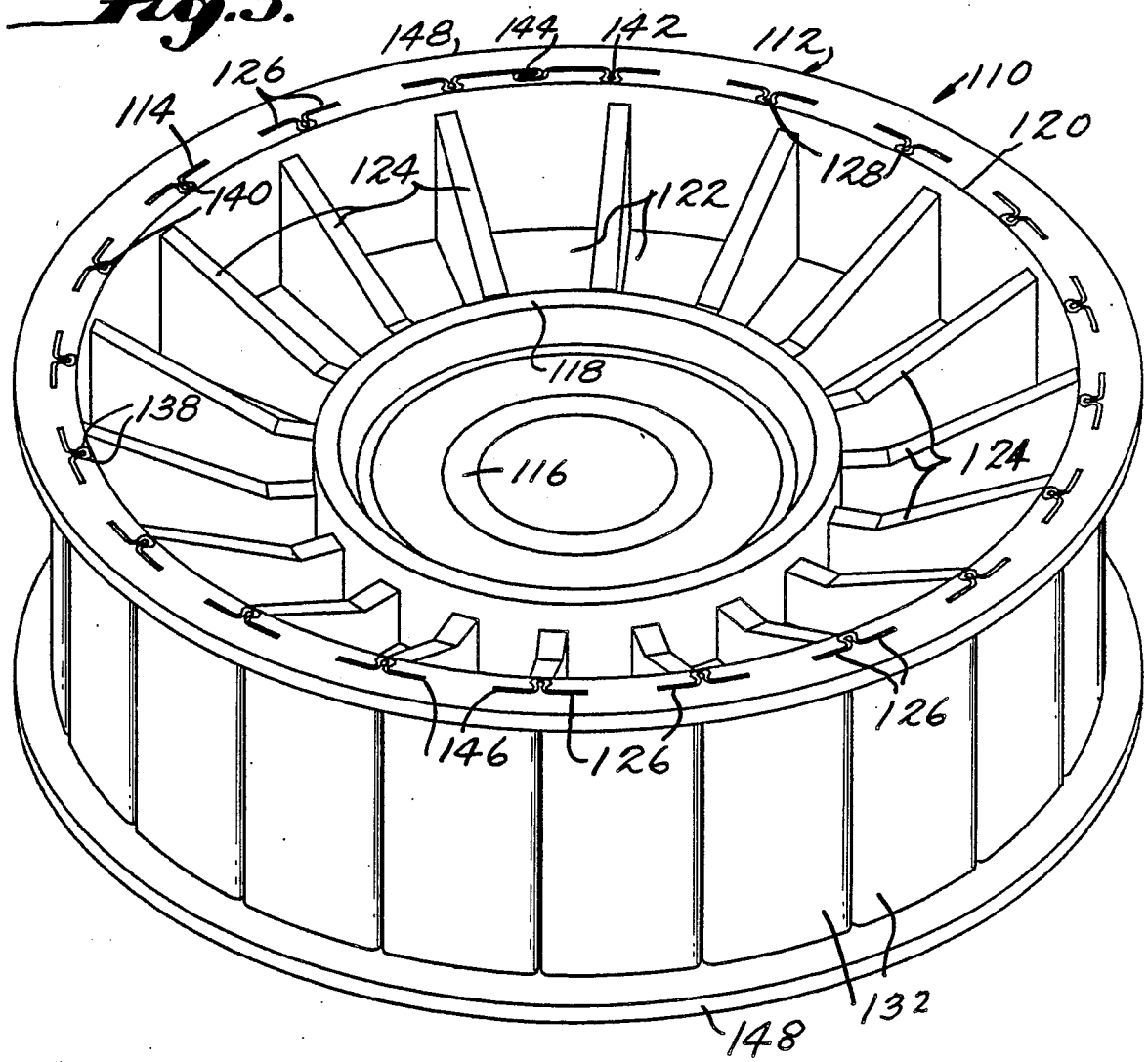
FIG. 3 is a perspective view of a modified form of pulley embodying the principles of the present invention.
Figure 4:
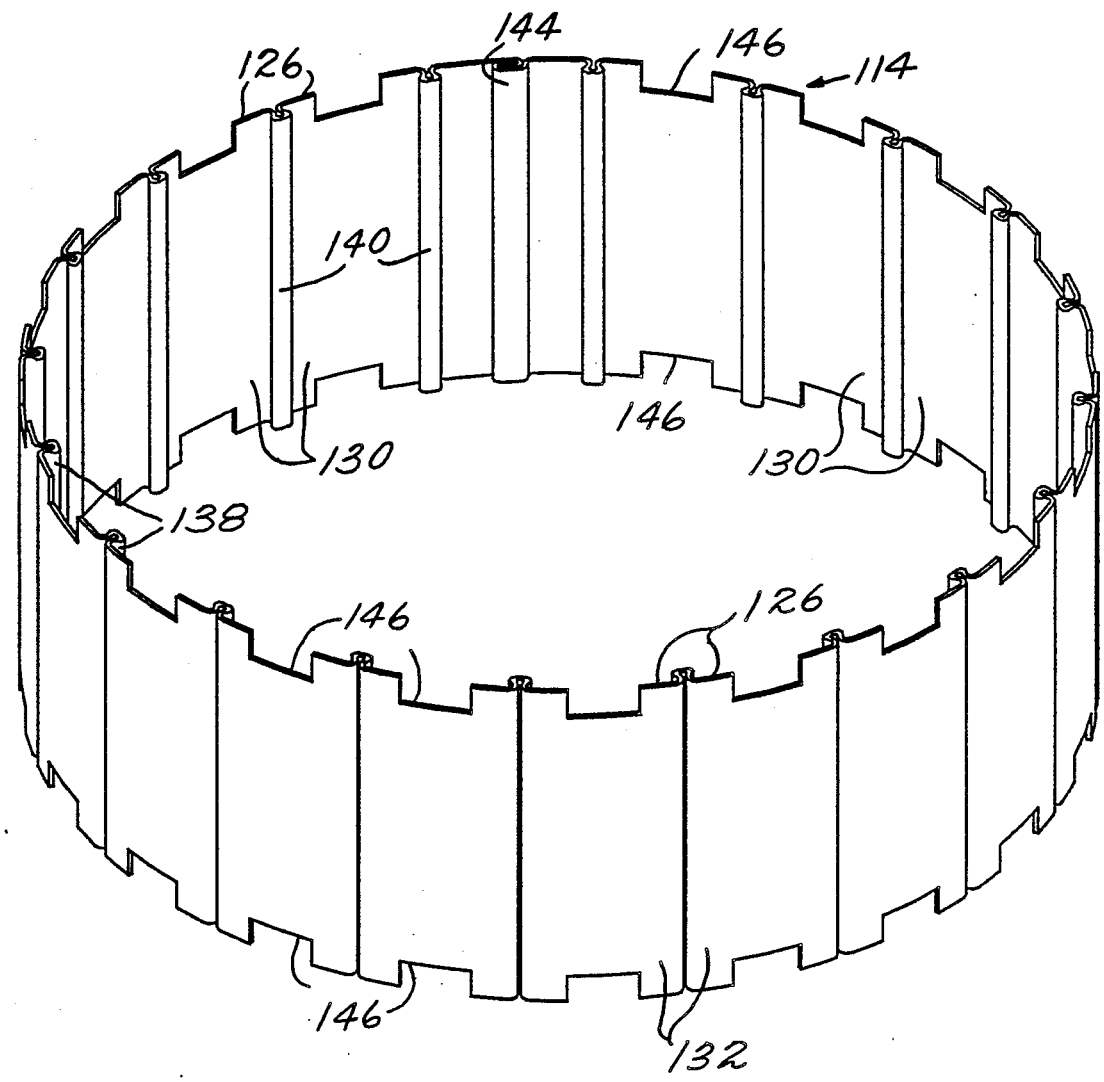
FIG. 4 is a perspective view of the rim structure utilized the pulley of FIG. 3.

FIGS. 3 and 4 illustrate another embodiment of a pulley, generally indicated at 110, constructed in accordance with the principles of the present invention. The pulley 110 is formed of an annular body of plastic material 112 and rim structure 114. Both the body 112 and rim structure 114 are formed similarly as in the embodiment of FIGS. 1 and 2 with corresponding parts being designated by the same reference numerals with the added prefix 1. One difference embodied in the rim structure 114 is that each arcuate section 226 has a rectangular notch 146 formed in each side thereof. The body of plastic material 112 includes a pair of radially outwardly extending annular flanges 148, the plastic material of which extends through the notches 146 to integrally form the flanges 148 as a part of the body 112. As shown, the flanges 148 are spaced at the ends of opposite exterior peripheral surfaces 132 of the arcuate sections 126 so that the sides of the belt engaged therewith are retained between the flanges 148.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A pulley for engaging an endless belt or the like suitable for automotive vehicular use comprising
   an annular body of plastic material including an annular inner hub portion defining a central axis, an annular outer peripheral portion and an intermediate portion integrally interconnecting the annular outer peripheral portion in concentric relation with said inner hub portion, and
   a temperature compensating-wear resistant rim structure formed of metal,
   said rim structure being formed with a series of wear resistant arcuate sections spaced apart with a temperature compensating connecting section extending between adjacent ends of adjacent arcuate sections,
   said arcuate sections including inwardly facing surfaces,
   the peripheral portion of said annular plastic body including surfaces secured to the inwardly facing surfaces of said arcuate sections and the connecting sections therebetween so that said arcuate sections present outwardly facing arcuate surfaces disposed within a surface of revolution about the axis of said hub portion for engaging the endless belt.

2. A pulley as defined in claim 1 wherein said surfaces of the peripheral portion of said annular plastic body are secured to the inwardly facing surfaces of said arcuate sections and the connecting sections therebetween by molding said plastic body with said rim structure.

3. A pulley as defined in claim 2 wherein said rim structure is made of steel in sheet form so that said connecting sections extend inwardly of the inwardly facing surfaces of said arcuate sections.

4. A pulley as defined in claim 3 wherein said rim structure is formed from a strip of steel sheet metal having opposite ends fixed together, each of said connecting sections being of generally U-shaped configuration including a pair of leg portions having one pair of ends integral with adjacent ends of the adjacent arcuate sections between which the connecting section extends and a second pair of ends between which an integral bight portion extends, the second pair of ends of each pair of leg portions being spaced apart by the associated bight portion a distance greater than the spacing between the associated first pair of ends.

5. A pulley as defined in claim 4 wherein the ends of said steel sheet metal strip are fixedly interconnected by a lapped joint within one of said arcuate sections, said lapped joint extending inwardly beyond the inwardly facing surface of said one arcuate section, said body being molded with said rim structure so that a surface of said outer peripheral portion adheres to said lapped joint.

6. A pulley as defined in claim 5 wherein said plastic body is molded with a pair of axially spaced integral annular flanges extending radially outwardly beyond the outwardly facing arcuate surfaces of said arcuate sections on opposite sides thereof for retaining opposite edges of the endless belt engaging said outwardly facing arcuate surface therebetween.

7. A pulley as defined in claim 6 wherein said plastic material comprises glass-reinforced nylon.

8. A pulley as defined in claim 6 wherein said connecting sections have an arcuate extent substantially less than the arcuate extent of said arcuate sections, the one pair of ends of each connecting section being spaced closely together with plastic material filing the space between the leg and bight portions thereof.

9. A pulley as defined in claim 6 wherein said intermediate portion includes a central annular wall extending radially between said inner hub portion and said outer peripheral portion, and a plurality of annularly spaced strengthening ribs extending axially in opposite directions from said central annular wall between said inner hub portion and said outer peripheral portion.

10. A pulley as defined in claim 6 wherein said plastic body is molded with a ball bearing assembly having an outer periphery adhering to an inner peripheral surface of said hub portion.

11. A pulley as defined in claim 2 wherein said rim structure is formed from a strip of sheet metal having opposite ends fixed together, each of said connecting sections being of generally U-shaped configuration including a pair of leg portions having one pair of ends integral with adjacent ends of the adjacent arcuate sections between which the connecting section extends and a second pair of ends between which an integral bight portion extends, the second pair of ends of each pair of leg portions being spaced apart by the associated bight portion a distance greater than the spacing between the associated first pair of ends.

12. A pulley as defined in claim 11 wherein the ends of said steel sheet metal strip are fixedly interconnected by a lapped joint within one of said arcuate sections, said lapped joint extending inwardly beyond the inwardly facing surface of said one arcuate section, said body being molded with said rim structure so that a surface of said outer peripheral portion adheres to said lapped joint.

13. A pulley as defined in claim 12 wherein said plastic body is molded with a pair of axially spaced integral annular flanges extending radially outwardly beyond the outwardly facing arcuate surfaces of said arcuate sections on opposite sides thereof for retaining opposite edges of the endless belt engaging said outwardly facing arcuate surface therebetween.

14. A pulley as defined in claim 2 wherein said plastic body is molded with a pair of axially spaced integral annular flanges extending radially outwardly beyond the outwardly facing arcuate surfaces of said arcuate sections on opposite sides thereof for retaining opposite edges of the endless belt engaging said outwardly facing arcuate surface therebetween.

15. A pulley as defined in claim 2 wherein said plastic material comprises glass-reinforced nylon.

16. A pulley as defined in claim 2 wherein said plastic body is molded with a ball bearing assembly having an outer periphery adhering to an inner peripheral surface of said hub portion.

* * * * *